United States Patent [19]

Cain

[11] Patent Number: 5,049,271
[45] Date of Patent: Sep. 17, 1991

[54] FUEL TANK FILTER
[75] Inventor: Thomas A. Cain, Woodstock, Ill.
[73] Assignee: Filtertek, Inc., Hebron, Ill.
[21] Appl. No.: 572,761
[22] Filed: Aug. 27, 1990
[51] Int. Cl.[5] ............................................. B01D 35/02
[52] U.S. Cl. .................... 210/250; 210/315; 210/323.1; 210/352; 210/356; 210/416.4; 210/460; 210/486
[58] Field of Search ............... 210/172, 250, 315, 350, 210/323.1, 352, 356, 460, 461, 484, 486, 416.4

[56] References Cited

U.S. PATENT DOCUMENTS

| | | | |
|---|---|---|---|
| 2,381,949 | 8/1945 | Goodloe et al. | 210/461 |
| 3,826,372 | 7/1974 | Bell | 210/172 |
| 4,312,753 | 1/1982 | Bell | 210/250 |
| 4,617,121 | 10/1986 | Yokoyama | 210/416.4 |
| 4,851,118 | 7/1989 | Kurihara | 210/315 |
| 4,961,850 | 10/1990 | Combest | 210/486 X |

Primary Examiner—Charles Hart
Attorney, Agent, or Firm—Willian Brinks Olds Hofer Gilson & Lione

[57] ABSTRACT

A fuel tank filter connectible to a fuel pump mounted inside of a fuel tank is disclosed. The filter includes filtration material forming an envelope, a separator inside the envelope and a spring attached to the separator in a manner such that the spring biases the separator to hold the envelope towards the bottom of the fuel tank.

14 Claims, 2 Drawing Sheets

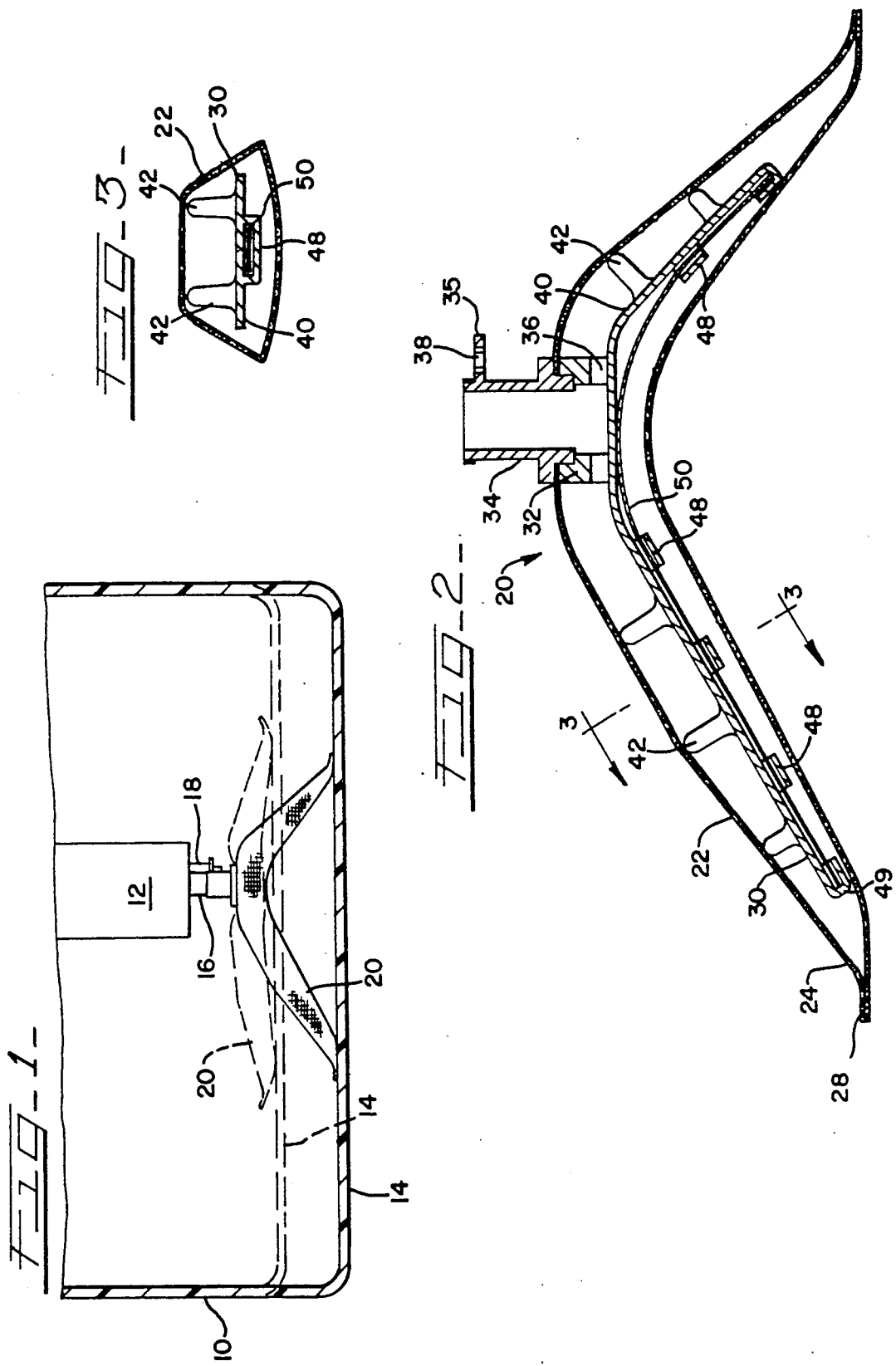

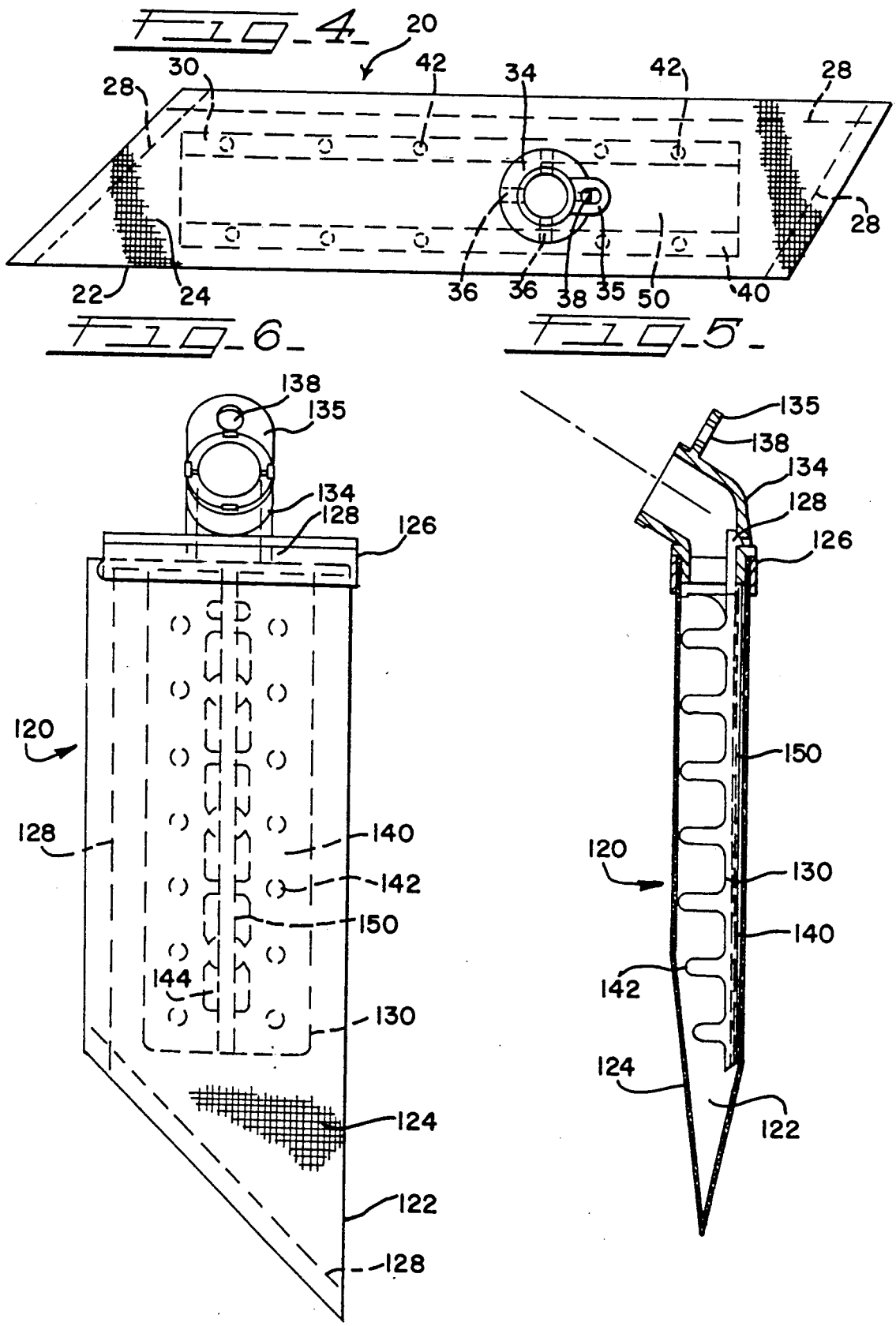

FUEL TANK FILTER

BACKGROUND OF THE INVENTION

The present invention relates to fuel tank filters, and more particularly to filters for use in a fuel tank where the fuel pump is housed inside the fuel tank and the fuel level sometimes falls below the bottom of the fuel pump.

Since the advent of fuel injected automobile engines, fuel pumps have been located inside of the automobile's fuel tank. Typically, the fuel pump is connected to a bracket on the top of the tank. Fuel lines, wires and other connectors may then be made to the pump through the top of the fuel tank. Generally, the fuel system is a closed system. Therefore, the fuel pump is rigidly fixed to the top of the tank to simplify sealing holes in the top of the tank through which the connections are made.

At present, with metal fuel tanks, the fuel pump inlet and a filter on that inlet remain submerged at the bottom of the fuel tank. The pump is typically designed to have its bottom inlet about one-half inch above the bottom of the tank. The rigidity of the metal tank assures that the distance between the top and bottom of the tank, and thus the one-half inch spacing, changes very little. The filters are designed to provide a "wicking" action so that even if the fuel level drops below the bottom of the pump inlet, such as during turning, stopping or hill climbing maneuvers, vapor will not enter the fuel pump inlet.

There is a current desire to change to plastic fuel tanks. These tanks are less rigid, and with thermal contraction and expansion, the distance between the top and bottom of the tanks has known to vary by as much as an inch. Since the pump is fixed to the top of the tank, an increase of an inch in the distance between the top and bottom of the tank results in the bottom of the fuel pump sometimes being more than one inch off the bottom of the tank. If the fuel depth in the tank is low at the same time the tank has expanded, the bottom of the fuel pump may be too far above the fuel for even the wicking action to provide fuel to the pump inlet. The fact that the bottom of the tank moves up and down, coupled with a requirement that fuel always be available at the pump inlet, presents a problem.

One attempted solution to this problem has been to use a fuel tank filter made out of an envelope of filtration material with an internal plastic separator. The separator is flexible, and biased so that it holds the filter envelope on the bottom of the tank. While this concept appears sound, the filters manufactured according to this design have not solved the problem. Tests conducted in developing the present invention show that the plastic used to construct the separator loses its flexibility after exposure to gasoline containing alcohol.

SUMMARY OF THE INVENTION

An improved fuel tank filter has been developed that overcomes the problem explained above. The filter includes filter material forming an envelope, a separator inside the envelope and a spring attached to the separator in a manner such that it biases the separator to hold the envelope toward the bottom of the tank.

In a preferred embodiment, the filter separator is constructed with a piece of spring steel embedded in or attached to the separator element. The separator element is still plastic, but the embedded spring steel assures that the separator will not lose its flexibility over time, even when exposed to fuels containing alcohol. Thus, the fuel tank filter of the present invention reliably allows for relative movement between the top and bottom of the fuel tank, while assuring fuel availability to the pump.

BRIEF DESCRIPTION OF THE DRAWINGS

FIG. 1 is a schematic representation of a filter of the present invention in place on a fuel pump inside of a fuel tank.

FIG. 2 is a cross-sectional view taken along the longitudinal centerline of the preferred fuel tank filter of the present invention.

FIG. 3 is a cross-sectional view taken along line 3—3 of FIG. 2.

FIG. 4 is a top-plan view of the filter of FIG. 2.

FIG. 5 is a side-view of filter of a second embodiment of the present invention.

FIG. 6 is a top-plan view of the filter of FIG. 5.

DETAILED DESCRIPTION OF THE DRAWINGS AND PREFERRED EMBODIMENTS OF THE INVENTION

As shown in FIG. 1, the filter 20 of the present invention is for use in a fuel tank 10. Also enclosed in the fuel tank 10 is a fuel pump 12, connected by wires, fuel lines and a bracket (all of which are conventional and none of which are shown) to the top of the tank 10. The present invention is designed for instances where the bottom 14 of the fuel tank, for one reason or another, moves up and down with respect to the fuel pump 12. As discussed above, this situation is most common where the fuel tank 10 is made of plastic, and the pump 12 is fixed to the top of the fuel tank 10.

The filter 20 attaches to the inlet 16 on the bottom of the pump 12. As shown in FIGS. 2 and 4, the filter 20 of the preferred embodiment includes a filtration material envelope 22 and a molded plastic separator element 30. The separator 30 is used to hold the envelope 22 open to improve fuel flow through the envelope 22. Preferably the envelope is made of a nylon screen material 24. The screen 24 is welded closed on its side and bottom ends by welds 28 to form the envelope shape.

The separator element 30 has a generally planer back 40 with upstanding projections 42 molded integrally therewith, best seen in FIG. 3. The projections 42 help to hold the walls of the envelope 22 away from each other and the back 40. As best shown in FIG. 2, the separator 30 has a fitting 32 integrally molded to its central section. The fitting 32 includes four holes 36 at 90° intervals around the bottom of the fitting 32. The holes 36 allow fuel from the envelope 22 to flow to the pump inlet 16. The screen 24 is sealed in between a top shoulder on fitting 32 and a bottom shoulder of a connector 34. The connector 34 is designed to fit over the end of the fuel pump inlet 16. A tab 35 at the top of the connector 34 includes a hole 38. A pin or tang 18 (FIG. 1) extending from the bottom of the fuel pump 12 fits through hole 38 to align the filter 20. Also, a fastener on the end of pin 18 may be used to secure the filter 20 to the pump inlet 16.

A spring 50, preferably made from flat stock spring steel, is attached to the back 40 on each side of the filter 20. The spring 50 is preferably in a bowed shape in its untensioned state. Thus, when it is attached to the back 40, it will tend to pull the filter 20 into the shape shown in FIG. 2. When the bottom of the tank 14 rises to its higher level (shown in phantom lines in FIG. 1), the tank bottom 14 pushes up on the filter 20, spreading the two sides apart so that the filter 20 takes the shape shown in phantom lines in FIG. 1. This movement of course puts the spring 50 into a tensioned state. When the tank bottom 14 drops, the spring 50 pushes the two sides of filter 20 into their original position, which holds the filter material envelope 22 against the bottom 14 of the fuel tank.

The spring 50 is preferably attached to the back 40 by being placed in channels 48 molded onto the back 40, as best seen in FIG. 3. The spring 50 could also be embedded in the back 40 during molding. During assembly of the preferred embodiment, the left end of spring 50 is slid through the channels 48 (skipping the far right channel), going from right to left, and coming to a stop in end channel 49 on the far left. The far right channel is somewhat open on the bottom so that the end of spring 50 can snap up into place.

In the preferred embodiment, the spring 50 is about ⅜ of an inch wide and 0.012 inches thick. The filter envelope 22 is about 1¾ inches wide and 8½ inches long. The separator element 30 is about 1⅜ inches wide and 5½ inches long. The back 40 is about 0.050 inches thick. If desired, holes may be made through the back 40 to allow for improved fuel flow inside the envelope 22. The projections 42 are about 0.090 inches in diameter and 5/16 of an inch high. The separator 30 and connector 34 are preferably made from acetal resin, though they could also be made from nylon. The preferred screen 24 has a 180 by 38 mesh, and is capable of removing impurities 60 microns or larger. The fitting 32 and connector 34 are preferably secured together and sealed around the screen 24 by sonic welding.

A filter 120 of a second embodiment of the invention is shown in FIGS. 5 and 6. The filter 120 is not as long as the filter 20, and thus extends to only one side of the pump inlet. For the most part, it has the same elements as the filter 20. For this reason, the elements of the two embodiments are numbered with the same reference numbers, increased by 100 for the filter 120.

There are, of course, several differences. In the filter 120, the screen 124 is held into a rigid coupling element 126 by having the coupling 126 molded around it. The coupling 126 is designed to snap onto the end 128 of the separator element 130 after the separator element 130 is inserted into the envelope 122. The end 128 of the separator element 130 fits inside of connector 134. The connector 134 is in the shape of an elbow that connects directly to the pump inlet 16.

The back 140 includes holes 144 to allow fuel to more easily flow into the envelope 122 through the screen 124 on the bottom side of the filter 120. The back 140 is integrally molded with the end 128. However, the back 140 may pivot up and down compared to the connector 134. The spring as shown is embedded in the plastic making up the back 140. The spring 150 may also be held to the back 140 by screws or other methods, such as the channels 48 in the filter 20.

It should be appreciated that the apparatus of the present invention is capable of being incorporated in the form of a variety of embodiments, only a few of which have been illustrated and described above. The invention may be embodied in other forms without departing from its spirit or essential characteristics. For example, other spring materials may be used, including other cross sectional shapes of spring steel. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

I claim:

1. A fuel tank filter connectible to the inlet of a fuel pump mounted inside of a fuel tank comprising:
   a) filtration material forming an envelope;
   b) a separator inside the envelope; and
   c) a spring attached to the separator in a manner such that the spring biases the separator to hold the envelope towards the bottom of the fuel tank.

2. The fuel tank filter of claim 1 wherein the filter envelope and separator are elongated and extend on both sides of the pump inlet.

3. The fuel tank filter of claim 2 wherein the spring is in a bow shape and attaches to the separator on both sides of the inlet.

4. The fuel tank filter of claim 1 wherein the spring comprises flat spring steel.

5. The fuel tank filter of claim 1 wherein the spring fits within a channel molded onto the separator.

6. The fuel tank filter of claim 1 wherein the spring is embedded in plastic used to mold the separator.

7. The fuel tank filter of claim 1 wherein the separator comprises a generally planer back member having projections extending from at least one face thereon.

8. A fuel tank filter for use in an automobile fuel tank containing a fuel pump having an inlet inside the fuel tank, comprising:
   a) filtration material forming an envelope;
   b) internal means for holding the envelope open;
   c) means for connecting the filter envelope to the fuel pump inlet; and
   d) a metal spring spanning between the connecting means and the holding open means for biasing the holding open means toward the bottom of the fuel tank, said metal spring being unaffected in its operation by contact with gasoline containing alcohol.

9. The fuel tank filter of claim 8 wherein the holding open means comprises a plastic separator, and the separator is molded to the spring.

10. A fuel tank filter comprising:
    a) a connector for connecting the fuel filter to the inlet of a fuel pump;
    b) filtration material forming an envelope;
    c) a separator inside said envelope; and
    d) a metal spring attached to said separator and shaped so as to force said separator toward the bottom of said fuel tank.

11. The fuel tank filter of claim 10 wherein the separator is plastic and connected to the metal spring by being molded to the spring.

12. The fuel tank filter of claim 10 wherein the spring comprises flat spring steel.

13. The fuel tank filter of claim 10 wherein the spring extends in more than one direction from the connector.

14. The fuel tank filter of claim 10 wherein the connector comprises a two part element and the filtration material is sealed between adjacent flanges of the two parts.

* * * * *